United States Patent [19]

Guiseley

[11] 4,096,327

[45] Jun. 20, 1978

[54] MODIFIED KAPPA-CARRAGEENAN

[75] Inventor: Kenneth B. Guiseley, Union, Me.

[73] Assignee: FMC Corporation, Philadelphia, Pa.

[21] Appl. No.: 756,815

[22] Filed: Jan. 5, 1977

[51] Int. Cl.$^2$ ............................................. C07H 5/10
[52] U.S. Cl. .................................... 536/122; 106/205; 426/575; 536/114; 536/118
[58] Field of Search ................. 536/114, 120, 122, 52, 536/118

[56] References Cited

U.S. PATENT DOCUMENTS

| | | | |
|---|---|---|---|
| 3,176,003 | 3/1965 | Stancioff | 536/122 |
| 3,223,699 | 12/1965 | Schlageter | 536/114 |
| 3,305,543 | 2/1967 | Haskell | 536/52 |
| 3,700,612 | 10/1972 | Fath et al. | 536/114 |

*Primary Examiner*—Johnnie R. Brown

[57] ABSTRACT

Modified kappa-carrageenan containing hydroxyalkyl groups each having two to three carbon atoms, the degree of substitution of such groups above the corresponding unsubstituted kappa-carrageenan being from 0.1 to 2.0 meq. per gram, forms aqueous gels exhibiting decreased syneresis and melting point and increased compliancy as compared with the corresponding unmodified kappa-carrageenan. The modified kappa-carrageenan is useful in food products as well as in latex paint.

6 Claims, No Drawings

MODIFIED KAPPA-CARRAGEENAN

This invention relates to a modified kappa-carrageenan containing hydroxyalkyl groups each having two to three carbon atoms, the modified kappa-carrageenan having the characteristic of forming an aqueous gel displaying decreased syneresis and melting point and increased compliancy as compared with the corresponding unmodified kappa-carrageenan.

It has hitherto been proposed to hydroxyalkylate various carbohydrates other than carrageenan to alter their properties. In Berni et al. U.S. Pat. No. 3,150,920, hydroxyalkylation of cellulose is said to impart permanent-crease characteristics; in Schlageter U.S. Pat. No. 3,223,699 hydroxyalkylation of tamarind is taught to improve binding properties for paper, etc. The baking qualities of guar gum are improved by hydroxyalkylation as described in Yueh U.S. Pat. No. 3,222,185 and the hydration rate of galactomannans is increased by hydroxyalkylation according to Nordgren et al. U.S. Pat. No. 3,723,408 while hydroxyalkylation of starch is said to lower its gelatinization temperature (i.e., dissolution temperature) in Elizer U.S. Pat. No. 3,673,171. Schweiger et al. U.S. Pat. No. 3,349,077 describes increasing the solvent compatibility of xanthan by hydroxyalkylation, and in Guiseley U.S. Pat. No. 3,956,273, there is described the hydroxyalkylation of agarose or agar to form products having a gelling temperature lower than that of the corresponding unmodified agarose or agar.

Kappa-carrageenan has been widely used as an aqueous gelling agent in various gel products, particularly as a substitute for gelatin in food products. However, aqueous kappa-carrageenan gels are deficient in that they display an undesirably large extent of syneresis when subjected to aging or to mechanical deformation, e.g., cutting; moreover, they display a melting temperature above normal body temperature (37° C.) as well as a relatively low compliancy (as measured by penetration values), so that when eaten, they provide a sensation of stiffness or rubberiness and do not melt in the mouth or release flavoring agents in the mouth as do gels made of gelatin. Attempts have been made to overcome these shortcomings by adjusting the potassium and calcium ion content of the aqueous gel composition as well as by blending the kappa-carrageenan with iota carrageenan or with other gums such as locust bean gum, low methoxyl pectin and the like, but adjustment of the calcium and potassium ion content without any other change is ineffective to achieve the desired results by providing an aqueous gel having a melting point below 37° C.; blending with other gums is expensive and requires careful control of the purity of the other gums.

It has now been found that hydroxyalkylation of kappa-carrageenan to introduce hydroxyalkyl groups each having two to three carbon atoms, the degree of substitution of such groups above the corresponding unsubstituted potassium carrageenan being from 0.1 to 2.0, preferably 0.2 to 0.5, gram-milliequivalent per gram of product, is effective to provide a product which forms aqueous gels marked by decreased syneresis and melting point as compared to the unmodified kappa-carrageenan and displaying increased compliancy as measured by increased penetration values. Moreover, the gel properties of the product of the present invention can be further modified by adjusting ion content and by blending with other gums in the same way as can the properties of the unmodified kappa-carrageenan; the effect of adjusting potassium ion content is about the same as in the case of unmodified kappa-carrageenan, but the effect of blending locust bean gum with the product of the invention is decidedly less than it is in the case of the unmodified kappa-carrageenan.

Degree of substitution, i.e., the number of gram-milliequivalents of hydroxyalkyl group per gram of product, can be determined by conventional analytical procedures such as those described by Lortz, Anal. Chem., Vol. 28, 892–895 (1956) and Morgan, I. & E.C., Anal. Ed., Vol. 18, 500–504 (1946). Each hydroxyalkyl group is considered to be monovalent.

The compliancy of the aqueous gel composition can be determined by measuring the extent of penetration (in centimeters) of a plunger into a standard specimen of gel at the breaking or rupture point of the gel using the test apparatus and procedure described in Foster and Moirano U.S. Pat. No. 3,342,612 dated Sept. 19, 1967, the description of which is incorporated herein by reference, and providing an automatic drive to advance the plunger at a constant rate of 0.28 cm./sec. By measuring the elapsed time from initial contact of the plunger with the gel until break, the total extent of travel of the plunger can be determined; from this is subtracted the extent of travel of the weighing pan (on which the gel specimen rests) caused by the plunger-applied load; the difference is the extent of penetration.

Hydroxyalkylated kappa-carrageenan of the present invention forms aqueous gels having melting points as much as 10°–20° C. lower than those formed from the corresponding unmodified kappa-carrageenan. This makes it possible to formulate dessert gel compositions which, as a result of adjustment of potassium and calcium ion content, exhibit melting points below 37° C. as well as decreased syneresis and at the same time an increased compliancy (as measured by penetration at break). The hydroxyalkylated kappa-carrageenan of the present invention resembles in gel properties the iota carrageenan which is obtained from a different and more expensive variety of sea plant than is kappa-carrageenan, and can be used as a substitute for iota-carrageen in products such as dessert gels which have in the past been made from blends of iota- with kappa-carrageenan.

The kappa-carrageenan which can be hydroxyalkylated in accordance with the present invention is that portion of crude carrageenan which is precipitated from aqueous solution by potassium ions as described for example in Kirk-Othmer Encyclopedia of Chemical Technology, Vol. 17, Second Edition, page 775 et seq. (1968). However, the kappa-carrageenan need not be purified before hydroxyalkylation; crude carrageenan containing a mixture of kappa- and lambda-carrageenan can be hydroxyalkylated, but the properties of the lambda-carrageenan are not improved, only the properties of the kappa-carrageenan portion being changed as described herein by the hydroxyalkylation. The hydroxyalkylation is preferably carried out in an aqueous medium, the kappa-carrageenan being first dissolved in strong aqueous alkali, about 0.05 to 1.5 molar in alkali metal hydroxide. To the solution is added a conventional hydroxyalkylating agent such as ethylene oxide, propylene oxide, 2-chloroethanol, epichlorohydrin, or the like at a temperature from room temperature up to 100° C. The reaction is continued until the desired degree of substitution has been attained, whereupon the solution is neutralized by the addition of a suitable acid such as hydrochloric or acetic acid, or the alkali is removed by dialysis or other conventional procedure, and the modified kappa-carrageenan is recovered by conventional procedure such as gelling by cooling, or precipitation by mixing with it a water-miscible organic solvent such as methanol, ethanol, propanol, acetone, etc. and the like.

Inasmuch as some discoloration or darkening of the kappa-carrageenan tends to occur during the hydroxyalkylation procedure, it is desirable, although not essential, to block the aldehyde end group of the carrageenan when dissolving it in the aqueous alkali solution. Blocking of the aldehyde group is preferably accomplished by reducing it with a reducing agent such as a borohydride, particularly an alkali metal borohydride such as sodium borohydride which reduces the aldehyde to an alcohol group.

When a difunctional reagent such as epichlorohydrin is employed to effect the hydroxyalkylation, it must be used under conditions which prevent cross-linking and which result in a water-soluble product, i.e., soluble to the extent of at least 2% by weight at 90° C. As is well known, cross-linking can be avoided by employing a dilute (less than about 3.5% by weight) solution of the carrageenan for the reaction and by other techniques well known to those skilled in the art. Except in the case of such difunctional reagents, there is nothing critical about the concentration or other conditions employed for the hydroxyalkylation reaction.

The hydroxyalkylation reaction is continued until the degree of substitution of hydroxyalkyl is from 0.1 to 2.0 gram-milliequivalent per gram of product, preferably from 0.2 to 0.5 gram-milliequivalent per gram.

The hydroxyalkylation process of the present invention can also be carried out in an organic solvent such as N,N-dimethyl-formamide, pyridine, or similar solvents, in which case blocking of the aldehyde end group is usually unnecessary, little or no discoloration occurring during the reaction.

The following examples are intended to illustrate more fully the nature of the invention without acting as a limitation upon its scope.

EXAMPLE 1

There was added to 570 grams of water 30 grams of a commercial product sold under the trademark Gelcarin HMR consisting of a mixture of kappa- and lambda-carrageenan (about 3:1 by weight). The mixture was heated in a boiling water bath for 45 minutes with agitation, then allowed to stand 2 hours at 63° C. to form a solution. There was added 20 ml. of 3 molar aqueous sodium hydroxide solution and the mixture was stirred, then further diluted by the addition of 150 ml. of 0.1 molar aqueous sodium hydroxide solution to provide a finished solution containing 4% by weight of kappa-carrageenan in 0.1 molar sodium hydroxide solution.

The solution was stirred at a temperature of 67–72° C. while there was bubbled into it over a period of 1¼ hours 35 grams of ethylene oxide. The mixture was then neutralized to a pH of 8.0 with 25 ml. of 3 molar acetic acid plus a few drops of one molar hydrochloric acid, and the solution was mixed with 2.5 volumes of 85% aqueous isopropyl alcohol to precipitate the hydroxyethylated product. The precipitate or coagulum was separated from the liquid, squeezed out, washed with 85% isopropyl alcohol, again squeezed to remove excess liquid, then shredded by hand and dried in a circulating hot air oven at 60° C. The weight of recovered product was 29.3 grams of material containing 0.6 milliequivalent of hydroxyethyl per gram of product.

In order to determine compliancy of an aqueous gel made with the product, there was dissolved in 180 grams of water at 80° C. a mixture of 3.6 grams of product and 0.36 grams of potassium chloride. A sample of the solution was cooled in a crystallizing dish, while another sample of aqueous gel composition was made under the same conditions as a control sample using the same amount of unmodified kappa-carrageenan in place of the hydroxyethylated product. Both samples were then gelled by cooling the solution to 25° C. and the compliancy of each was measured by means of the test apparatus and procedure described above, using in the apparatus a plunger head having a diameter of 0.431 inch (11.0 mm.) and carrying out the measurement at 25° C.

The control sample showed a compliancy or penetration of 0.6 cm. with a force of 438 grams on the plunger at rupture, but the hydroxyethylated carrageenan gel was too soft and compliant to measure at this temperature, and so it was thoroughly chilled at 10° C. and measured at that temperature. It displayed a penetration of 1.87 cm. with a break force of 73 grams at the lower temperature.

The viscosity of a 1.5% aqueous solution of the unmodified kappa-carrageenan and of the hydroxyethylated carrageenan was measured at 75° C. using a Brookfield LVF viscometer, No. 1 spindle at 12 rpm. and was determined to be 142 cps. for the unmodified kappa-carrageenan and 100 cps. for the hydroxyethylated product, showing that only a minor change in molecular weight of the kappa-carrageenan occurred during the hydroxyethylation.

The hydroxyethylated product displayed a degree of substitution of 0.6 gram meq. per gram of product and the aqueous gel composition used for the penetration test exhibited a melting point of 25° C. as compared to a melting point of 60° C. for the corresponding sample of unmodified kappa-carrageenan.

Syneresis was determined by preparing a control gel containing 3% by weight in water of a mixture consisting of 57 parts by weight of unmodified kappa-carrageenan, 23 parts of iota carrageenan, 10 parts of potassium chloride, and 10 parts of standard diluent. This gel is typical of those used commercially with conventional additives such as fragrances to form air freshener gels. A second gel was prepared under the same conditions and having the same composition except that 23 parts by weight of the hydroxyethylated carragee. 1 was substituted for the iota-carrageenan in the foregoing recipe. The first gel, containing iota-carrageenan, displayed a penetration of 0.84 cm. at a break force of 380 grams, while the second gel displayed a penetration of 0.86 cm. at a break force of 415 grams. After storing the two gels for 2 hours at 25° C., a spoonful of gel was removed from each sample in order to promote syneresis. The amount of syneresis fluid was 1.5 g. in the control gel and 2.1 g. in the test gel, indicating virtually no difference in behavior. If kappa-carrageenen such as the unmodified starting material for the hydroxyethylated product had been used, the amount of syneresis would have been 3–5 g., and the penetration value would have been 0.6–0.7 cm., a significant difference from the values observed for both the hydroxyethylated product and the iota-carrageen.

The hydroxyethylated kappa-carrageenan prepared as described above was also found to be useful as a substitute for hydroxyethyl cellulose as a thickener for latex paint. The hydroxyethylated carrageenan displayed improved stability against attack by enzymes from mildew fungi, and the latex paint containing the hydroxyethylated carrageenan displayed slower recovery of viscosity after subjection to high shear than did a control sample containing hydroxyethyl cellulose tested under the same conditions. The slower recovery provided better leveling of the paint.

EXAMPLE 2

There was dissolved in 2400 ml. of 0.1 molar sodium hydroxide, 100 grams of the same kappa-carrageenan used in Example 1 and the solution was heated to 72° C. There was bubbled into the solution while maintained at this temperature for a 55 minute period 75 grams of ethylene oxide, after which the solution was maintained at 72° C. for an additional hour, then neutralized with 80 ml. of 3 molar acetic acid, after which the solution was mixed with 6.25 liters of 85% aqueous isopropyl alcohol. The precipitate or coagulum was separated as described in Example 1, yielding 96.5 grams of hydroxyethyl carrageenan having a degree of substitution of 0.73 milliequivalent per gram of product. The compliancy of an aqueous gel containing the product was measured as described in Example 1; at 10° C. the gel displayed a break force of 104 g./sq.cm. and a penetration of 2.95 cm. at break.

A typical recipe for a dessert gel mix is as follows, in which the parts are by weight:

| Ingredient | Parts |
|---|---|
| Sucrose | 76.9 |
| Adipic acid | 3.0 |
| Potassium citrate monohydrate | 1.0 |
| Calcium sulfate dihydrate | 0.25 |
| Flavor | 0.40 |
| Color | 0.03 |
| Carrageenan | 3.50 |

In a conventional commercial dessert gel mix the carrageenan is a mixture of 3.0 parts of high-purity kappa-carrageenan (Gelcarin HWG) with 0.5 part of iota-carrageenan.

Three different samples of such recipes were prepared, the first containing a mixture of kappa and iota-carrageenan as described above, the second containing in place of the iota-carrageenan 0.5 part of a less pure form of unmodified kappa-carrageenan (Gelcarin HMR), and the third containing 0.5 part of the hydroxyethylated carrageenan prepared as described in Example 2 from the less pure kappa-carrageenan (Gelcarin HMR). Aqueous gels were prepared by dissolving 85.08 g. of each sample in 2 cups of hot water to form a solution containing 15.2% of the recipe total solids by weight and allowed to gel by cooling, and the gel strength and penetration at break were measured in each as described in Example 1 except that there was used a plunger having a diameter of 21.4 mm. The results were as follows:

| Composition | Gel Strength | Penetration at Break |
|---|---|---|
| Mixture of kappa- and iota-carrageenan | 89 grams | 1.64 cm. |
| Mixture of two unmodified kappa-carrageenans | 233 grams | 0.47 cm. |
| Mixture of kappa-carrageenan with hydroxyethylated kappa-carrageenan | 41 grams | 2.19 cm. |

The syneresis of the last sample was observed to be comparable to that of the first and markedly less than that of the second. The effect of hydroxyethylation is apparent from a comparison of the second sample with the third.

EXAMPLE 3

Hydroxyalkylated carrageenan was prepared as described in the preceding example except that in place of ethylene oxide, there was employed 132 grams of propylene oxide and the solution was maintained at 60° C. instead of 72° C. during the reaction. The product contained hydroxypropyl groups, the degree of substitution being 0.46 grams-milliequivalent per gram of product.

An aqueous gel composition was prepared from the hydroxypropylated carrageenan as described in Example 1 above. It displayed a gel strength of 54 grams and a penetration of 2.30 cm. at break measured at 10° C. using a plunger having a diameter of 11.0 mm., and exhibited a melting temperature of 25° C.

EXAMPLE 4

There was prepared a solution containing 181 ml. water, 1 ml. of a solution containing 4.4 molar sodium borohydride in 14 molar sodium hydroxide, and 20 ml. of 3 molar sodium hydroxide. In this solution was dissolved 10 g. of the same kappa-carrageenan used in Example 1. The solution was heated to 80° C. and maintained at that temperature while there was introduced over a 20 to 30 minute period a solution containing 4.4 ml. of beta-chloroethanol in 22 ml. of water. The solution was stirred an additional 2 hours, then neutralized to a pH of about 8.0–8.5 with 3 molar acetic acid. The solution was then mixed with 2 volumes of 85% aqueous isopropyl alcohol to precipitate the product which was then separated, washed with water, dried at 60° C., then ground to produce a solid hydroxyethylated kappa-carrageenan in finally-divided form passing a 40-mesh screen.

The same procedure was repeated except that there was used in place of the solution of beta-chloroethanol a solution containing 4.5 ml. of propylene oxide in 22.5 ml. of water to produce a hydroxypropylated product.

As a control, the procedure was repeated omitting both the solution of beta-chloroethanol and the solution of propylene oxide.

Three aqueous gel compositions were made by preparing water solutions each containing 1% by weight of one of the three products together with 1% of potassium chloride, then cooling to 25° C. for 1 hour. The gels were tested as described in Example 1 using a plunger having a diameter of 11.0 mm. at 25° C. with the following results. Viscosity of an aqueous solution of the products was also measured. The results were as follows:

| Sample | Degree of[1] Substitution | Viscosity[2] (cps) | Gel Strength (grams) | Penetration cm. |
|---|---|---|---|---|
| Control | — | 37.1 | 273 | 0.66 |
| Hydroxyethyl | 0.40 | 49.2 | 83 | 1.61 |
| Hydroxypropyl | 0.11 | 32.2 | 90 | 0.80 |

[1]Degree of substitution expressed as g.meq. of substituent/g. of product.
[2]Viscosity measured in 1.5% solution at 75° C. with #1 spindle at 60 rpm on Brookfield LVF viscometer.

When the same hydroxyethylation and hydroxypropylation procedures were used with iota carrageenan, the compliancy of the aqueous gel composition, measured in terms of penetration at break, was virtually identical with that of the unmodified iota carrageenan having the same calcium ion content.

In the case of lambda carrageenan, neither the control nor the hydroxyethylated or hydroxypropylated products formed a gel.

EXAMPLE 5

Kappa-carrageenan was prepared by extracting *Eucheuma cottonii* according to the procedure of Stanley U.S. Pat. No. 3,094,517 using calcium hydroxide. The filtrate from the extraction process was neutralized with acetic acid and the kappa-carrageenan isolated in the usual manner by coagulation with isopropyl alcohol, then washed with isopropyl alcohol, dried and ground. This was designated Sample A.

A second sample was prepared in the same way except that the kappa-carrageenan employed was prepared by extracting *Eucheuma cottonii* with a mixture of calcium and sodium hydroxide; it was designated Sample B.

Each sample was hydroxyethylated by dissolving 60 g. in 1440 g. of an 0.5 molar water solution of sodium hydroxide at 80° C. along with 600 meg. of beta-chloroethanol and stirring the solution for an hour at temperature, then neutralizing with 3 molar aqueous acetic acid and mixing with twice its volume of 80% aqueous isopropyl alcohol to form a precipitate or coagulum which was washed with aqueous isopropyl alcohol, dried and shredded. Chemical analyses of the two samples were carried out with the following results:

| | Percent | |
|---|---|---|
| Ingredient | Sample A | Sample B |
| $H_2O$ | 10.07 | 9.01 |
| $Na^+$ | 3.53 | 4.43 |
| $K^+$ | 1.37 | 1.53 |
| $Ca^{++}$ | 1.55 | 0.42 |
| $Mg^{++}$ | 0.22 | 0.06 |
| Ester sulfate | 20.74 | 21.28 |
| Inorganic sulfate | 0.95 | 0.11 |
| $Cl^-$ | 0.38 | 0.44 |
| 3,6-anhydro-D-galactose | 30.70 | 31.70 |
| Degree of substitution, g.meq. per g. | 0.43 | 0.68 |

Aqueous gel compositions were prepared from each of these samples using the following recipe in which the parts are by weight:

| | |
|---|---|
| Hydroxyethylated kappa-carrageenan | 2% |
| Potassium chloride | 0.2% |

The gels, tested as in Example 1 using a plunger having a diameter of 11.0 mm. at 10° C., displayed the following properties:

| | Gel Strength g/cm$^2$ | Penetration cm. | Melting Temp. ° C. |
|---|---|---|---|
| Hydroxyethylated product of Sample A | 185 | 1.19 | 37 |
| Hydroxyethylated product of Sample B | 59 | 2.02 | 30 |

A typical dessert gel mix was prepared having the following recipe:

| Ingredient | Parts |
|---|---|
| Sugar | 38.52 grams |
| Adipic acid | 1.25 gram |
| Potassium citrate mono-hydrate | 0.20 gram |
| Flavor | 0.05 gram |
| Hydroxyethylated product of Sample A | 3.0 gram |

This mix was dissolved in sufficient hot water to make a total of 300 grams then allowed to gel by cooling. The gel displayed a break strength of 333 grams, penetration of 2.36 cm. measured at 7° C. using a plunger having a diameter of 21.4 mm. The gel displayed a melting point of 25° C. and very low syneresis.

EXAMPLE 6

To 18 gallons of tap water was added 11.5 pounds of a strong-gelling high purity kappa-carrageenan sold under the trademark Gelcarin HWG and the mixture was heated with stirring to 190° F. Hot water was added to the solution to produce a total volume of 25 gallons after which a solution of 424 grams of sodium hydroxide in 1.5 gallons of water was stirred in together with additional water to make 28 gallons. Ethylene oxide was bubbled in at a constant rate until the desired amount had been added as shown in the following table. Agitation was continued for 15 minutes, then the solution was cooled and diluted with warm water to a total of 35 gallons having a temperature of 170° F. or less. The alkali was neutralized to pH 8.5 by adding 3 molar acetic acid and the solution filtered with 6 pounds of diatomaceous earth filter aid. The filtrate was mixed with 2.5 volumes of 80% aqueous isopropyl alcohol to precipitate the hydroxyethylated kappa-carrageenan product. The product was separated on a screen, washed with 40 gallons of fresh isopropyl alcohol and squeezed dried, then dried in hot air at 140°–160° F. Three different samples were prepared by this procedure using three different weights of ethylene oxide and having three different degrees of substitution as shown in the following table. The gelling characteristics of each sample, as well as of the unmodified kappa-carrageenan starting material, were determined by preparing an aqueous solution containing 2% by weight of the starting material or of the hydroxyethylated kappa-carrageenan and 0.2% by weight of potassium chloride. The table lists the decrease in melting temperature of the gel below that of the unmodified kappa-carrageenan for each sample:

| | Sample | | |
|---|---|---|---|
| | A | B | C |
| Wt. ethylene oxide, oz. | 42 | 56 | 70 |

-continued

|  | Sample | | |
|---|---|---|---|
|  | A | B | C |
| Degree of substitution, g. meq. per g. | 0.41 | 0.44 | 0.50 |
| Decrease in melting temperature from unmodified kappa-carrageenan | 13° | 15° | 16° |

Each of the foregoing samples was then employed in a dessert gel recipe as described in Example 5 above. Two different specimens of each sample were prepared, one containing 0.10 gram of potassium citrate monohydrate, the other containing 0.2 gram. The strength, penetration and melting temperature of each product was then measured under the same conditions with the following results:

|  | Sample | | | | | |
|---|---|---|---|---|---|---|
|  | A | | B | | C | |
| Potassium citrate monohydrate | 0.1 | 0.2 | 0.1 | 0.2 | 0.1 | 0.2 |
| *Compliancy (penetration in cm.) | 1.14 | 0.98 | 1.75 | 1.82 | 3.08 | 2.13 |
| Melting temperature ° C. | 22.5 | 33.5 | 21.5 | 31.0 | 20 | 28.5 |

*Measured with plunger 21.4 mm. diam. at 7° C.

What is claimed is:

1. Kappa-carrageenan containing hydroxyalkyl groups each having 2 to 3 carbon atoms, the degree of substitution of such groups above the corresponding unmodified kappa-carrageenan being from 0.1 to 2.0 gram-milliequivalent per gram.

2. Kappa-carrageenan as claimed in claim 1 in which said hydroxyalkyl is hydroxyethyl.

3. Kappa-carrageenan as claimed in claim 1 in which said hydroxyalkyl is hydroxypropyl.

4. Kappa-carrageenan as claimed in claim 1 in which the degree of substitution is from 0.2 to 0.5 gram-milliequivalent per gram.

5. Kappa-carrageenan as claimed in claim 2 in which the degree of substitution is from 0.2 to 0.5 gram-milliequivalent per gram.

6. Kappa-carrageenan as claimed in claim 3 in which the degree of substitution is from 0.2 to 0.5 gram-milliequivalent per gram.

* * * * *